L. R. McMANUS.
VEHICLE INDICATOR.
APPLICATION FILED NOV. 13, 1918.
1,313,398.
Patented Aug. 19, 1919.
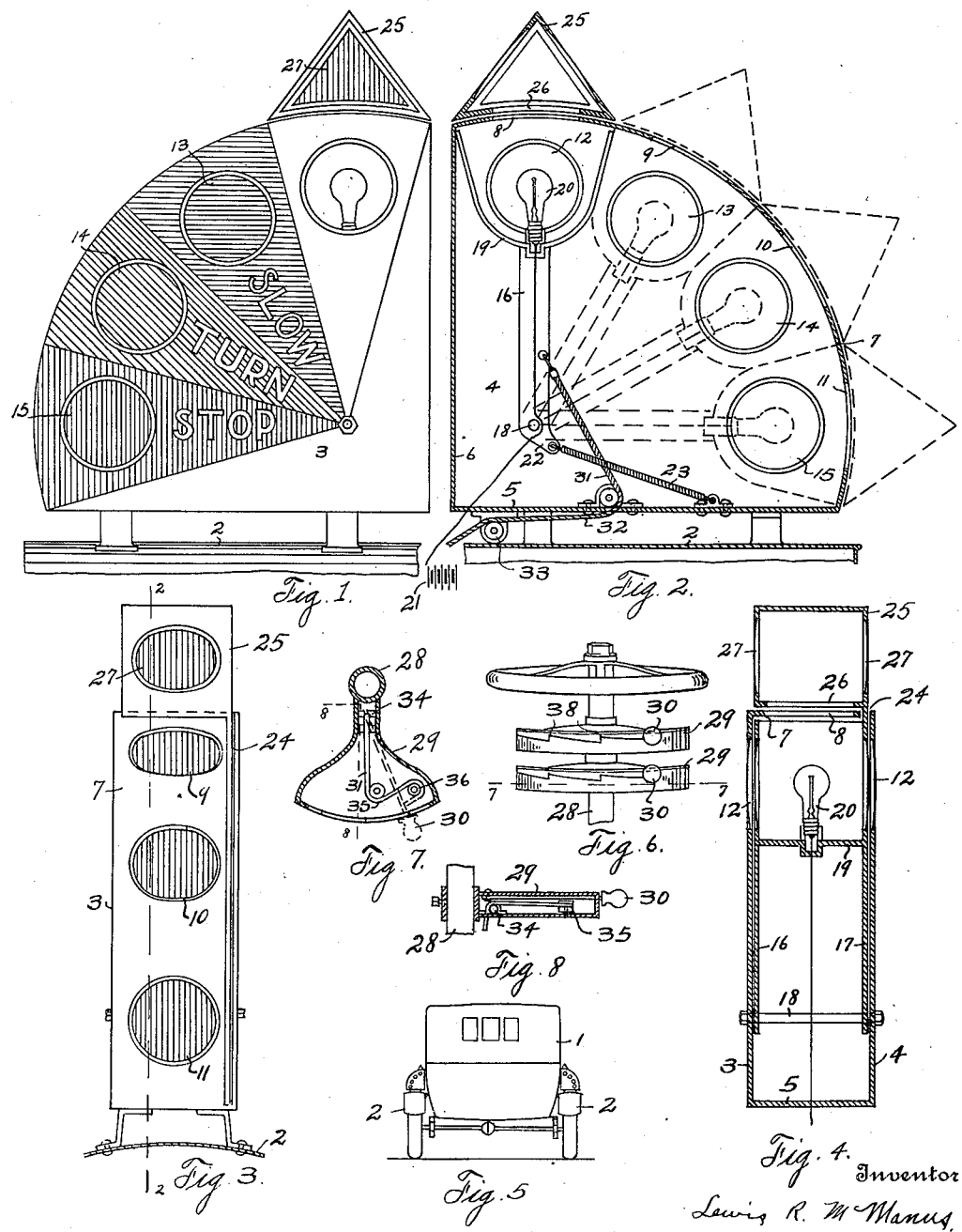
Inventor
Lewis R. McManus,
By Hardway & Cathey
Attorneys

UNITED STATES PATENT OFFICE.

LEWIS R. McMANUS, OF HOUSTON, TEXAS.

VEHICLE-INDICATOR.

1,313,398.　　　　　Specification of Letters Patent.　　Patented Aug. 19, 1919.

Application filed November 13, 1918. Serial No. 262,273.

*To all whom it may concern:*

Be it known that I, LEWIS R. MCMANUS, a citizen of the United States, residing at Houston, in the county of Harris and State of Texas, have invented certain new and useful Improvements in Vehicle-Indicators, of which the following is a specification.

This invention relates to new and useful improvements in a vehicle indicator.

The object of the invention is to provide a device of the character described, which is specially designed for use on vehicles such as automobiles, to indicate the movements of the vehicle.

Another object of the invention resides in the provision of an indicator of the character described, which may be readily operated by the driver, so as to indicate to those in front, or in the rear, the intended movement of the vehicle being driven.

Another feature of the invention resides in the provision of an indicator of the character described which may be cheaply and easily constructed and readily attached to any ordinary automobile, or other vehicle.

With the above and other objects in view, the invention has particular relation to certain novel features of construction, operation and arrangement of parts, an example of which is given in this specification and illustrated in the accompanying drawings, wherein:

Figure 1, is a rear view of the device.

Fig. 2, is a sectional view taken on the line 2—2 of Fig. 3.

Fig. 3, is a side elevation.

Fig. 4, is a vertical sectional view.

Fig. 5, shows a rear view of an automobile, showing the indicator attached thereto.

Fig. 6, shows the upper end of the steering column with the means for operating the indicator applied thereto.

Fig. 7, shows a transverse sectional view thereof, taken on the line 7—7 of Fig. 6, and Fig. 8, shows a sectional view, taken on the line 8—8 of Fig. 7.

Referring now more particularly to the drawings wherein like numerals of reference designate similar parts in each of the figures, the numeral 1, refers to an automobile, having the rear fenders 2, 2, on each of which an indicator is mounted. Preferably an indicator will be mounted on each rear fender, but as they are precisely similar in construction and operation, a description of one will suffice as a description for both. A casing has been provided which is preferably formed of sheet metal, and which has the front and rear walls 3 and 4, spaced apart, and the bottom and inner side walls 5 and 6, extending at right angles to each other. The outer wall 7 is arcuate in general contour and has the circular openings 8, 9, 10 and 11, and the front and rear walls 3 and 4 have the corresponding windows 12, 12, 13, 13, 14, 14, and 15, 15, formed of white, blue, green and red glass, respectively; the outer side of the front and rear walls 3 and 4, are divided into segments, corresponding to the windows 12, 13, 14 and 15, as shown in Fig. 1, and said segments are painted or enameled white, blue, green and red, corresponding to the colors to the corresponding windows, and the blue, green and red segments, respectively, have the words, "Slow", "Turn", and "Stop" enameled, or painted, thereon in white, so as to be easily visible.

Within the casing, there is a lamp bracket formed of the front and rear arms 16 and 17, which are pivoted at their lower ends upon the transverse bolt 18, and whose outer ends carry an arcuate hood 19, which is provided with a socket to receive the ordinary light globe 20, which is electrically connected with the battery 21, carried by the automobile in the usual manner. The hood 19 is of sufficient width to fit closely between the front and rear walls of the casing, and its outer edges fall short of the outer walls of the casing, as shown in Fig. 2. The arm 16 has an extension 22, to which one end of the coil spring 23 is attached. The other end of said spring is attached to the bottom wall of the casing, and this spring normally holds the bracket in vertical position, so as to hold the lamp between the white panes 12. The arm 17 is extended through a slot 24, in the outer wall 7, of the casing, and carries a hood 25, which is triangular in cross section. This hood consists of a metallic framework, having its side 26, adjacent the casing, open, and having its other sides formed of panes of red glass 27, so as to be visible at all times from the front, rear or side.

The numeral 28, refers to the steering column, having the rack members 29, 29, secured thereto, each rack member being provided with a hand lever 30. A cable 31 is attached to the arm 16, between its pivoted end and its free end, and this cable passes around suitable pulleys 32, and 33, and thence passes underneath the automobile body, and its other end passes up the steering column and around suitable pulleys, as 34, 35, and 36, and is attached to the corresponding lever 30. The rack members 29 are provided with notches, as 38, spaced a suitable distance apart, for engagement with the corresponding levers 30. Normally, the lamp bracket will stand in vertical position, the electric light 20 being thereby held between the white panes 12, thus giving off a white light. When it is intended to slow up the vehicle, the levers 30 are moved into the first notch 38, operating through the corresponding cable 31, to pull the lamp bracket into position to carry the electric light 20 between the blue windows 13, and a blue light will then be given off. Likewise, the light may be moved between the green windows, or between the red windows, indicating "turn" and "stop", respectively. It is obvious, that the indicators on both sides may be operated independently or simultaneously.

At all times, the hood 25 gives off a red light from all sides, said light passing from the electric lamp 20 through the open side 26, and through the red windows 27, forming the sides of said hood.

What I claim is:

1. An indicator, including a casing, having a front and rear wall, and a curved side wall, said front and rear walls each having a plurality of pairs of windows, the windows of each pair being oppositely arranged, and of various colors, the side wall of said casing being provided with openings corresponding to the respective pairs of windows, a lamp bracket pivoted within the casing, a lamp carried thereby, means for operating said bracket, to bring the lamp successively between the windows of the respective pairs, and a hood whose walls are formed of translucid material connected to said bracket and arranged to move along the outer side of said side wall.

2. An indicator including a casing, having a front and a rear wall, and a curved side wall, a plurality of windows in the front and rear walls, the corresponding windows being arranged oppositely, the side wall of said casing being provided with openings corresponding in position to said windows, said side wall also being provided with a slot, a bracket pivoted within the casing, a lamp carried by said bracket, an arm forming part of the bracket projecting through said slot, a hood fixed to the outer end of said arm and having translucid walls, and means secured to said bracket for moving said lamp and hood into alinement with said windows successively.

3. An indicator including a casing, adapted to be mounted upon the fender of an automobile, and including front and rear walls each having a plurality of transparent windows of different colors, the corresponding front and rear windows being in alinement, said casing also including a side wall provided with a plurality of openings, corresponding in position with said windows, and being also provided with an oblong slot, a bracket pivoted within the casing and having an arm which projects through said slot, a lamp carried by said bracket, a hood whose walls are formed of translucid material, fixed to the outer end of said arm, means for moving said lamp and hood into alinement with said windows successively, and a spring member connected to said bracket and normally holding the same in a given position.

In testmony whereof I have signed my name to this specification in the presence of two subscribing witnesses.

LEWIS R. McMANUS.

Witnesses:
IRENE BRUNS,
WM. A. CATHEY.